United States Patent
Wiley et al.

(10) Patent No.: US 7,222,368 B2
(45) Date of Patent: May 22, 2007

(54) MECHANISM FOR CONTROLLING IF/WHEN MATERIAL CAN BE PRINTED ON A SPECIFIC PRINTER

(75) Inventors: Anthony J Wiley, Bristol (GB); Luca Chiarabini, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 10/056,117

(22) Filed: Jan. 28, 2002

(65) Prior Publication Data

US 2003/0154383 A9   Aug. 14, 2003

(30) Foreign Application Priority Data

Jan. 31, 2001   (GB)   ................... 0102428.0

(51) Int. Cl.
*H04L 9/00* (2006.01)
*G06F 21/22* (2006.01)

(52) U.S. Cl. ................. 726/27; 713/194; 726/17

(58) Field of Classification Search ............... None
See application file for complete search history.

(56) References Cited

U.S. PATENT DOCUMENTS

| | | | | |
|---|---|---|---|---|
| 5,210,571 | A * | 5/1993 | Peloquin et al. ........... 399/11 |
| 6,233,684 | B1 * | 5/2001 | Stefik et al. ............... 713/176 |
| 6,362,897 | B1 * | 3/2002 | Berg et al. ................. 358/1.6 |
| 6,711,677 | B1 * | 3/2004 | Wiegley ..................... 713/151 |
| 6,801,935 | B2 * | 10/2004 | Shen .......................... 709/219 |
| 6,907,529 | B1 * | 6/2005 | Hirose ........................... 726/5 |
| 6,977,745 | B2 * | 12/2005 | Sharma ..................... 358/1.15 |
| 7,154,622 | B2 * | 12/2006 | Constantin et al. ........ 358/1.15 |
| 2001/0008557 | A1 * | 7/2001 | Stefik et al. ................ 380/202 |
| 2002/0042884 | A1 * | 4/2002 | Wu et al. .................... 713/201 |
| 2002/0112172 | A1 * | 8/2002 | Simmons .................... 713/193 |
| 2002/0194470 | A1 * | 12/2002 | Grupe ........................ 713/153 |
| 2003/0182475 | A1 * | 9/2003 | Gimenez ....................... 710/8 |
| 2004/0054893 | A1 * | 3/2004 | Ellis ........................... 713/165 |

FOREIGN PATENT DOCUMENTS

| | | |
|---|---|---|
| EP | 0 862 318 A2 * | 9/1998 |
| EP | 0929023 | 7/1999 |
| EP | 0935182 | 8/1999 |
| EP | 1091275 | 4/2001 |
| WO | WO 98/07254 | 2/1998 |

OTHER PUBLICATIONS

Search Report for corresponding Great Britain patent application No. 0102428.0 filed Jan. 31, 2001.

* cited by examiner

*Primary Examiner*—Christopher Revak

(57) ABSTRACT

A secure print system comprises a sending computer entity and a plurality of receiving entities, each capable of decrypting and printing a specified number of copies of a document. The sending computer entity and the plurality of receiving devices are each pre-registered with each other by means of unique device identification number, which is embedded in inaccessible hardware, firmware or software components at the point of manufacture, linking the sending computer entity and the plurality of receiving devices. The receiving devices, after decrypting a received message, print a specified number of copies only, before deleting the electronic data from which the document copies have been printed.

28 Claims, 11 Drawing Sheets

| Distribution list | | | |
|---|---|---|---|
| Document name: | company report.doc 604 | Copies | Acknowledge |
| Applianct: | Word 2000 605 | 1 | 603 |
| R1 address | R1 OTK 1 | 1 | 01.01.2001 21.50 |
| R2 address | R2 OTK 3 | 1 | 01.01.2001 21.50.30 |
| R3 address | R3 OTK 5 | 1 | 01.01.2001 21.52 |
| R4 address 600 | R4 OTK 17 601 | 2 602 | 01.01.2001 21.51 |

Fig. 6

MECHANISM FOR CONTROLLING IF/WHEN MATERIAL CAN BE PRINTED ON A SPECIFIC PRINTER

FIELD OF THE INVENTION

The present invention relates to the field of document printing, and particularly although not exclusively, to secure printing of documents.

BACKGROUND OF THE INVENTION

Conventional solutions for secure printing attach printing rights to an individual person. Typically, a person sending a secure text and/or image file, may encrypt that file, send it over a network to a recipient, and the recipient, on receiving the file, decrypts the file using a known encryption mechanism, on a personal computer (PC) or other equivalent computer entity. Having decrypted the file, the recipient can send the file to print, load the file onto a data carrier such as a floppy disk, writable CD ROM, digital data storage (DDS) format device or similar. Prior art systems have the characteristic that firstly, once decrypted, there is no limitation on the number of prints which can be made from a received file. Secondly, receipt of the document is location independent. Provided the correct decryption software is loaded into a computer entity, there is no restriction on where the document can be decoded or on which individual computer entity, or printer device printing of a document can take place. Thirdly, the ability to decrypt data follows possession of a decryption key and decryption software, and a person having that key and software has potentially no physically enforceable restrictions on use of the document once decrypted.

In commercial or government organizations, different types of information are accorded different levels of security. For example, a typical four level security system may comprise:
- Level zero—documents freely available to anyone inside or outside the organization, publicly available material.
- Level one—documents which are restricted for employees or personnel within the organization, and which are not to be released outside the organization.
- Level two—documents which are of a company confidential nature, such as technical reports, project specifications, and documents for which there would be commercial or other disadvantage in allowing to leak outside the organization
- Level three—documents having restricted access to named individuals, for example take over/merger plans, personnel files, details of individuals salaries, business plans, financially sensitive data such as company financial accounts before publication, and defense or governmental classified information.

For higher security level information, individual paper documents may be individually numbered, and named individuals authorised to read the documents listed within the documents. Documents may be subject to restrictions, such as a bar on photocopying the documents, and restriction on the number of physical copies in circulation.

Electronic storage of such documents may also be restricted to machines which can be physically locked away.

With prior art secure electronic document solutions using computers, a recipient is allowed access to an electronic version of a file, which can be loaded onto a data carrier. The underlying assumption is that a person authorised at a particular security level has access to information in electronic storable format. However, whilst physical paper documents containing information are readily physically identifiable and can be checked by security personnel on leaving a building, electronic data can be easily passed out of an organizations premises and computer networks by electronic means, and in large quantities, without trace.

Although paper based information is not entirely secure, and is capable of being photocopied or sent by facsimile, it requires more time and effort to photocopy documents, or send them by facsimile, than it does to send documents electronically. The speed of sending electronic documents, and the large data volumes which can be sent without trace, make electronic storage of documents inherently less traceable and less secure, than the same information stored in paper format.

SUMMARY OF THE INVENTION

Specific implementations according to the present invention associate rights to a digital object for example a document file, such that it is only possible to print the object on a pre-defined set of devices. Ownership and access of the devices is restricted, and the devices may be physically placed in secure areas.

By associating a restrictive set of rights to an object which explicitly identifies which devices the object may be printed on, a level of physical security can be applied to the printing of electronic data files. Files may be sent in encrypted format to a secure print room, which may ensure that unauthorized access to the encrypted file would not result in it being printed elsewhere.

An authorised device is able to identify whether any restrictive rights are applicable to an object being presented for printing, and depending upon the restrictions, either delete the object, or print it.

Specific implementations explicitly specify which devices may be used to print a particular file, thereby providing an extra level of physical security. Further, limits on a number of copies of a file which may be printed may be enforced.

According to a first aspect of the present invention there is provided a network connectable printer device comprising:
a data input device for receiving an encrypted digital document file;
a decryption algorithm for decrypting said received document file;
a controller for controlling printing of an image of data contained in said received document file; and
a printer mechanism for printing a physical copy of said document file,
wherein said controller operates to control printing of said physical copy, and after printing said physical copy, automatically deletes said electronic document file from said memory.

According to a second aspect of the present invention there is provided a printer device comprising:
a data input device for receiving an encrypted digital document file;
a decryption algorithm for decrypting said received document file;
a controller for controlling printing of an image of data contained in said received documents file; and
a printer mechanism for printing a physical copy of said document file, wherein said controller operates to check a unique device identification data contained in said document file with a stored unique device identification data of said printer device, and provided a successful match is found, print said physical copy of said document file; and if said received unique device identifier differs from said stored unique device identifier data, said controller operates to delete said document file without printing a physical copy of said document file.

According to a third aspect of the present invention there is provided a computer entity configured for sending secure encrypted document files, said computer entity comprising:

a data processor;

a memory;

an encryption algorithm capable of encrypting a document file;

a device selector for selecting a said uniquely identifiable recipient device;

a file selector for selecting a document file;

a stored list of a set of authorised recipient devices, each said recipient device identified by a unique device identifier data inaccessibly embedded within said computer entity;

wherein said computer entity operates to:

select at least one document file;

select at least one device of said set of uniquely identified recipient devices to send said document to;

encrypt said document files; and address said at least one document file to said selected uniquely identified device(s).

According to a fourth aspect of the present invention there is provided a distributed secure document printing system, said system comprising:

at least one sending computer entity, capable of sending an encrypted electronic document file, said document file having an encrypted data content, and a unique device identifier data identifying a recipient device to which said document file is intended to be printed by; and at least one recipient printer device, said recipient printer device capable of receiving said encrypted document file, establishing that said document file is intended for said recipient printer device, decrypting and printing said document file, and automatically deleting said electronic document file after printing a physical copy of a document from said document file.

According to fifth aspect of the present invention there is provided a method of securely communicating an electronic document file over a network, said method comprising the steps of:

encrypting said document file;

specifying a recipient device for sending said document file to, said recipient device being uniquely identifiable by a unique device identifier data;

attaching said unique identifier data to said document file;

sending said document file in encrypted format to said intended recipient device;

receiving said transmitted document file and decrypting said document file;

reading said unique device identifier data;

if said unique device identifier data corresponds to a unique device identifier data of said recipient device, printing a physical copy of said document file; and if said unique device identifier data of said document file does not correspond with said unique device identifier data of said recipient device, deleting said received document file without printing a physical copy of said document file.

According to a sixth aspect of the present invention there is provided a method of secure printing of a received document file, said method comprising the steps of:

receiving said document file in encrypted format at a receiving device;

decrypting said document file;

reading a unique device identifier data identifying a recipient device for which said document file is intended;

comparing said unique device identifier data with a locally stored device identifier data;

if said received unique device identifier data corresponds with said locally stored device identifier data, printing a physical copy of said document file;

if said received unique device identifier differs from said stored unique device identified data, deleting said document file.

According to a seventh aspect of the present invention there is provided a method of sending a document file for printing by a specified authorised recipient printing device, said method comprising the steps of:

selecting a content of said document file;

encrypting said content;

attaching a unique device identifier data, identifying a recipient device to which said document file is to be sent; and sending said document file to said recipient device.

According to an eighth aspect of the present invention, there is provided a method of secure printing of a received document file, said method comprising the steps of:

receiving said document file in encrypted format;

reading a unique device identifier data identifying a recipient device for which said document file is intended;

comparing said unique device identifier data with a locally stored identifier data corresponding to a local computer entity device;

if said locally stored identifier data differs from said unique device identifier data identifying said recipient device for which said document file is intended, deleting said document file without printing any physical copies of said document file.

According to a ninth aspect of the present invention, there is provided a method of secure printing of a received document file, said method comprising the steps of:

receiving said document file in encrypted format;

reading a unique device identifier data identifying a recipient device for which said document file is intended;

comparing said unique device identifier data with a locally stored device identifier data;

reading a permitted quantity data describing a permitted quantity of copies of said document file; and if said received unique device identifier data corresponds with said locally stored device identifier data, printing said permitted quantity of copies of said document file.

According to a tenth aspect of the present invention there is provided a computer entity comprising a data processor, a data storage device, a printer port, and having an attached printer device, said computer entity comprising:

a module for decrypting an encrypted document file;

a unique device identifier to identify said computer entity into a uniquely;

wherein said computer entity operates to:

receive a document file in encrypted format;

decrypt said document;

extract a unique device identifier data from said document and compare said extracted unique identifier data with said unique device identifier of said computer entity;

if a match is found between said received unique device identifier data and said unique identifier of said computer entity, send a said document file for print by said printer device; and after sending said document to said printer device, delete said document file.

According to an eleventh aspect of the present invention there is provided a printer device comprising:

a data input device for receiving an encrypted digital document file;

a decryption algorithm for decrypting said received document file;

a controller for controlling printing of an image of data contained in said received document file; and a printer mechanism for printing a physical copy of said document file, wherein said printer device locally stores a decryption key for operating said decryption algorithm to decrypt said received document file.

According to a twelfth aspect of the present invention there is provided a printer device comprising:

a data input device for receiving a digital document file;

a controller for controlling printing of an image of data contained in said received document file; and a printer mechanism for printing a physical copy of said document file, wherein said controller operates to compare a received unique identifier data contained in said received document file with a locally stored unique device identifier data stored at said printer device;

if said received unique identifier data matches said stored unique device identifier, control printing of at least one said physical copy of said document file; and if said received unique identifier data contained the said received document file does not match said stored unique device identifier data, to inhibit printing of any physical copies of said document file.

According to a thirteenth aspect of the present invention there is provided a printer device comprising:

a data input device for receiving an encrypted digital document file;

a decryption algorithm for decrypting said received document files;

a controller for controlling printing of an image of data contained in said received document file; and a printer mechanism for printing a physical copy of said document file, wherein a decryption key is stored locally in said printer device for operating said decryption algorithm to decrypt said received document files;

said controller operates to compare a received unique identifier data contained in said received document file with a locally stored unique device identifier data stored at said printer device;

if said received unique identifier data matches said stored unique device identifier, control printing of at least one said physical copy of said document file; and if said received unique identifier data contained the said received document file does not match said stored unique device identifier data, to inhibit decryption of said document file and to inhibit printing of any physical copies of said document file.

Other aspects of the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 6 illustrates schematically a visual display of a distribution list and history of documents sent over said network, displayed by said send computer entity;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
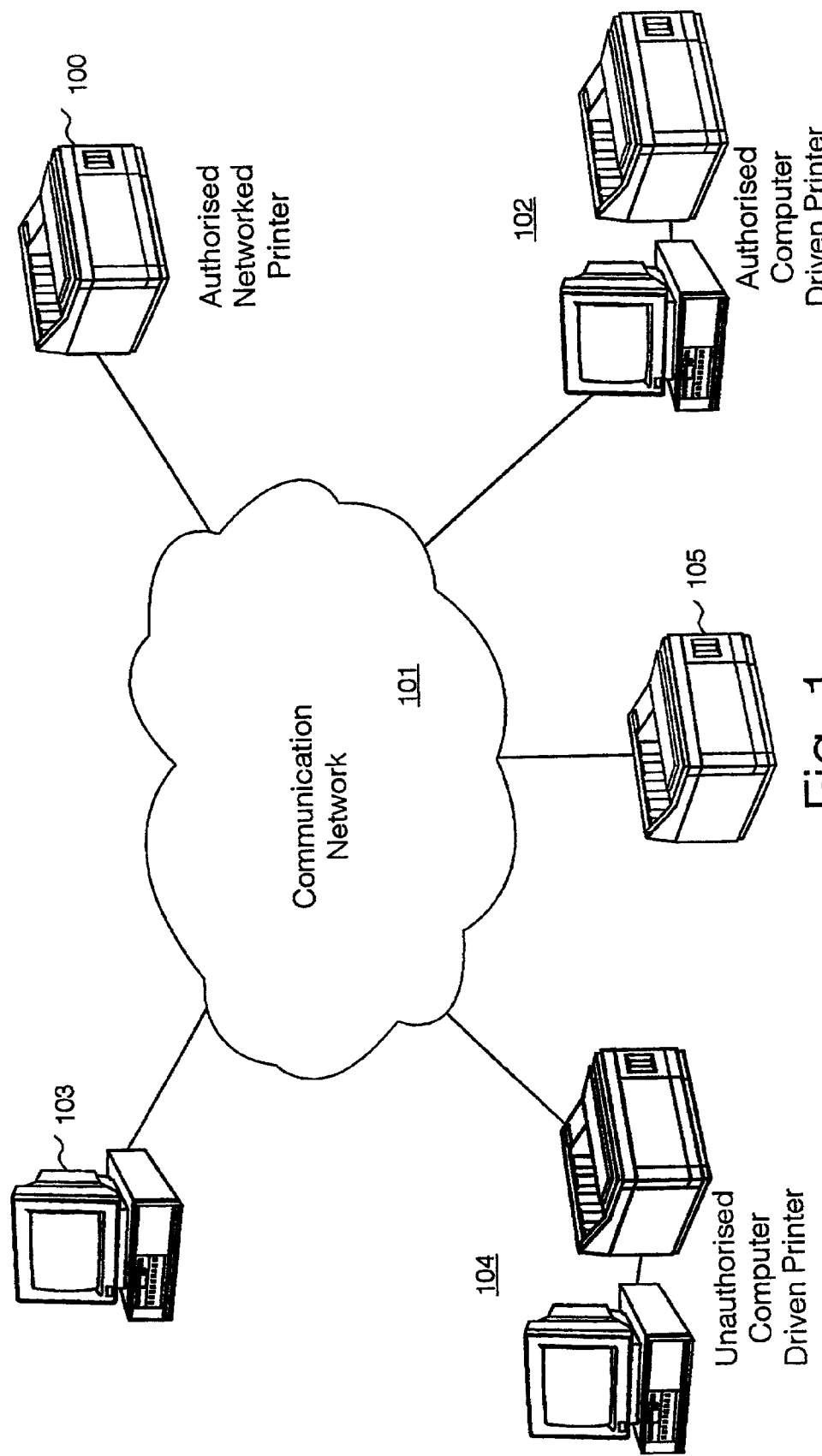
FIG. 1 illustrates schematically a secure document printing system for securely printing documents over an open access network.

Referring to FIG. 1 herein, there is illustrated schematically components in a secure printing system according to a specific implementation of the present invention. The system comprises one or more network attached secure printer devices 100 attached to a communications network 101, for example the internet, or a local area network; one or more secure receiving devices 102, each comprising a computer and printer device; and one or more secure data sending devices 103. In the network environment, there may be also attached a plurality of non-secure computer devices 104 having printer capabilities, and one or more non-secure network attached printer devices 105.

Secure data sending device 103 sends an encrypted document file over the communications network 101, for example the internet, to a designated authorised recipient device, 100 or 102. On receiving the encrypted document file, the authorised recipient device decrypts the document file, by a known decryption mechanism, and prints out an authorised number of copies of a document, which are specified in the document file sent over the communications network. Since the document file is encrypted, if the file becomes misappropriated or sent to a non-authorized computer by mistake, the encryption protects the data contained within the file. The one or plurality of authorised recipient devices are pre-registered with the secure data sending device 103, preferably at the point of manufacture, with data identifying each of the authorised recipient devices being embedded in the inaccessible software and/or hardware of the secure sending device 103. Similarly, data identifying the secure sending device 103 may be embedded in inaccessible hardware and/or software of each authorised recipient device 100, 102 at manufacture, so that the secure data sending device 103 and one or a plurality of authorised recipient devices are registered with each other by data installed into the inaccessible internal components of those devices at the point of manufacture. Therefore, a degree of trust in the secure data sending device and the recipient device(s) is given to those devices, by virtue of a purchaser or user of the system having trust in the company who manufactures the secure data sending device and recipient devices.

Whilst in the best mode implementation, document files are transferred over into an intermediate network between ascending computer entity and a recipient printer device, in other embodiments, the document file may be loaded onto an intermediate device having data storage capability, for example a mobile phone, or palm held computer entity, or lap top computer. The recipient printer device need not be network attached, but could receive a document file over an infra-red communications link, from such an intermediate device, storing the document file.

Document file transmission may be by any suitable method, for transfer into the recipient printer device. The document file may be introduced to the recipient printer device by means of a floppy disk, CD ROM, by presenting the printer device with an infra-red signal from a hand held portable data storage device, e.g. mobile phone, palm top computer entity, or lap top computer entity having infra-red transmission capability.

Figure 2:
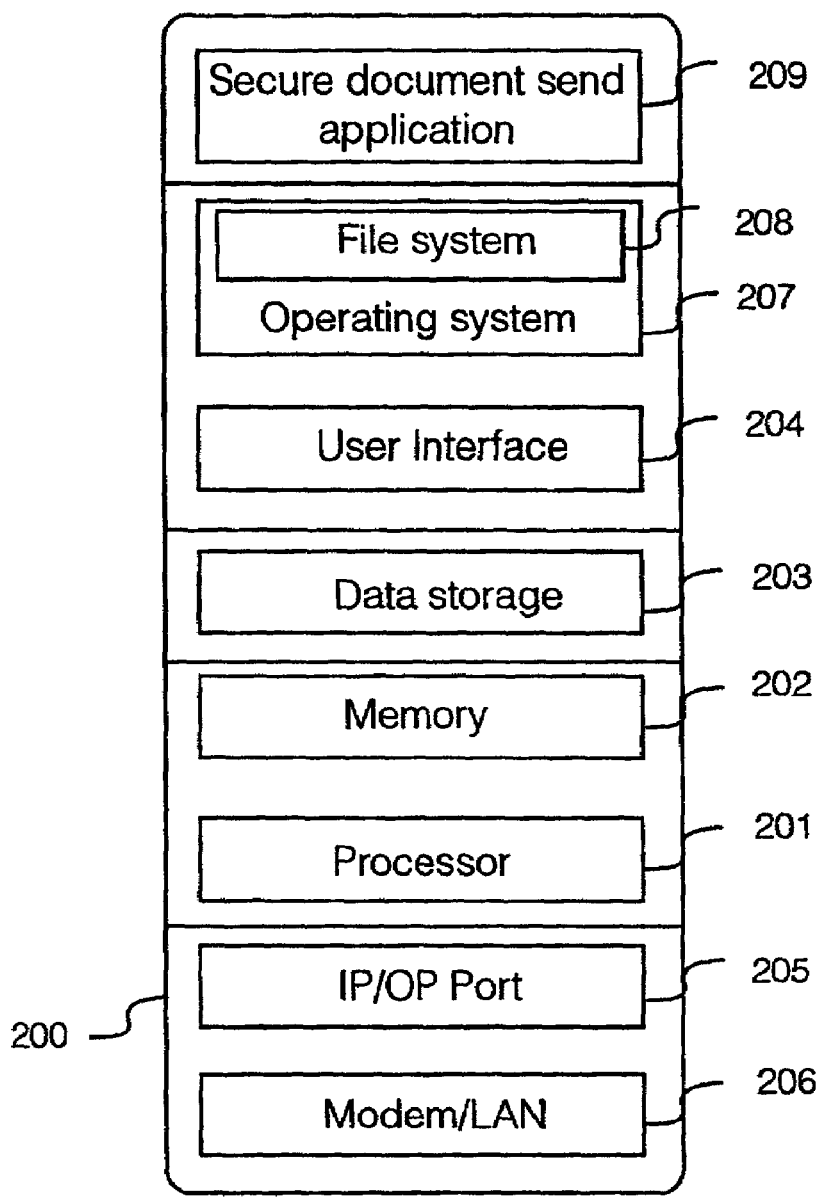
FIG. 2 illustrates schematically components of a sending computer entity for sending a secure document over said network.

Referring to FIG. 2 herein, there is illustrated schematically components of a computer entity adapted to send secure documentation to one or a plurality of secure printing devices.

The sending computer entity 200 comprises known components including a processor 201 with associated memory 202; data storage 203, for example a hard disk drive or the like; a user interface 204, including a visual display unit, keyboard, and pointing device eg mouse or trackball device; a plurality of input/output ports 205; a modem and local area network connection 206; an operating system 207 having a known file system 208; and a secure document sending application, 209 according to a specific implementation of the present invention. The secure document sending application 209 presents a user interface in the form of a visual display on the video monitor, by which a user can select documents from the file system of the operating system, encrypt those documents, and send them to designated secure destination devices, which are pre-registered with the sending computer entity.

Figure 3:
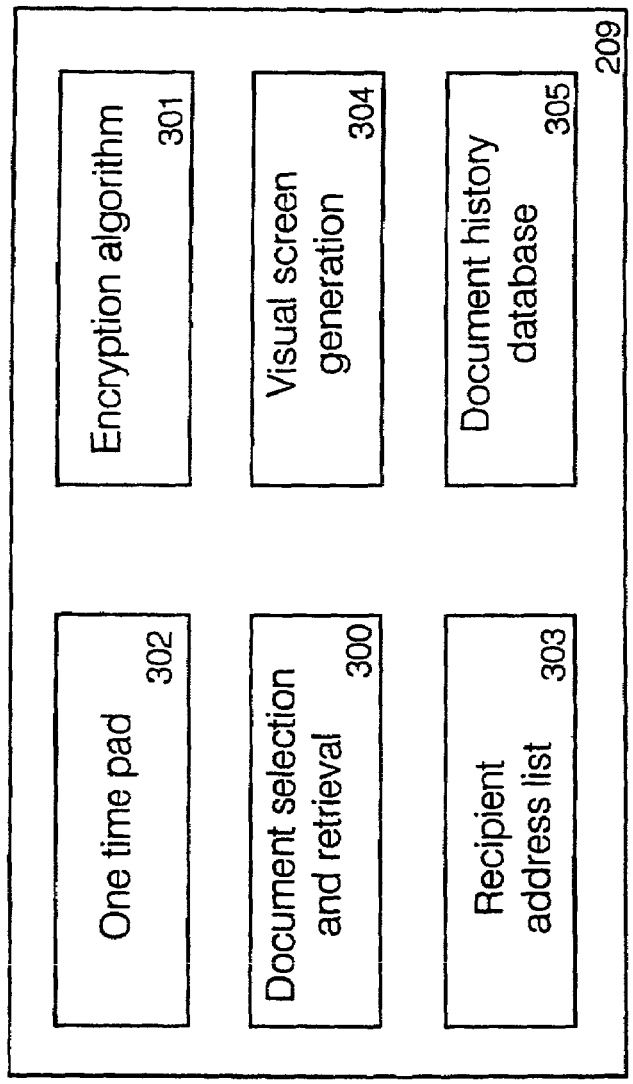
FIG. 3 illustrates schematically components of an application of said sending computer entity, for formatting a document file for sending over said network, and for storing a document history data.

Referring to FIG. 3 herein, there is illustrated schematically modules of the secure document send application 209. The application comprises a document selection and retrieval module 300, capable of interfacing with the file system of the operating system for the retrieval and selection of individual files, typically of text and/or image data; an encryption algorithm 301 of prior art type, for example the known DES, 3DES, RC5, CAST, IDEA, or Blowfish algorithms; optionally, a one-time pad module, containing a set of one-time pad encryption keys; a recipient address list 303 listing electronic addresses of a plurality of pre-registered receiving devices, e.g. network attached printers; a visual screen generation module 304 for generating a visual user interface allowing selection, encryption and sending of documents to the recipient devices; and a document history database 305 listing a history of send events of documents detailing which documents have been sent, the destinations and number of copies sent.

Figure 4:
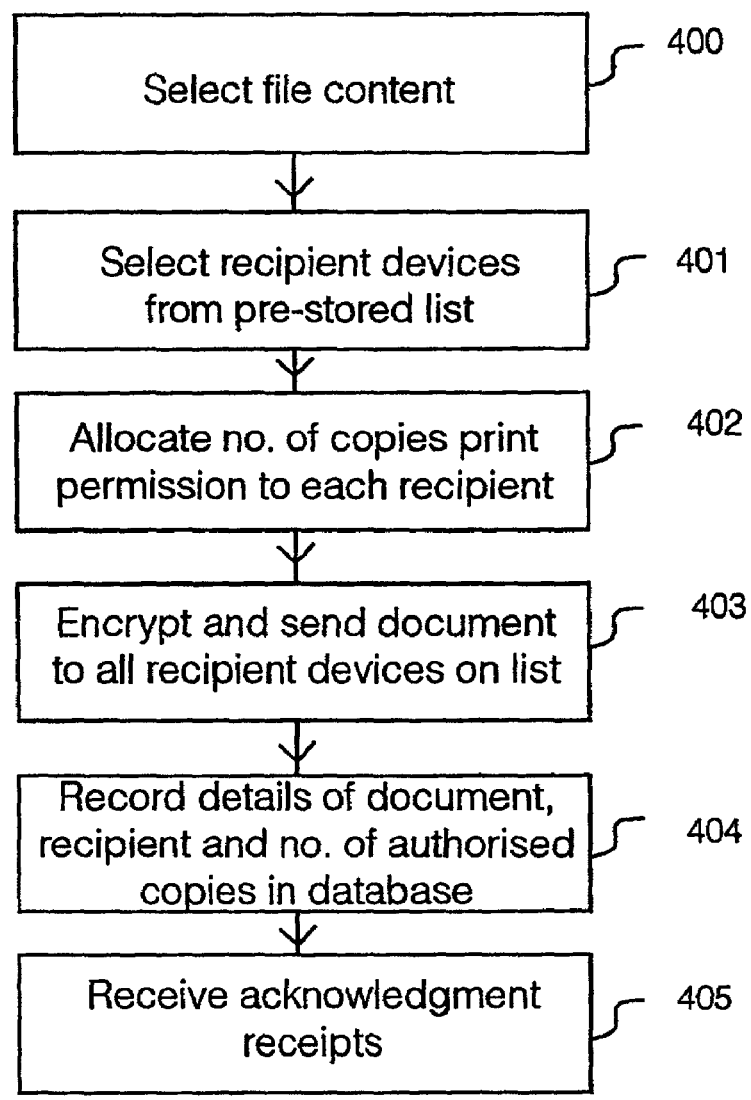
FIG. 4 illustrates schematically process steps carried out by the secure sending computer entity of FIG. 2.

Referring to FIG. 4 herein, there is illustrated schematically process steps implemented by the send computer entity 200 for sending secure documents across the network to specified recipient devices. In step 400, a user selects a file content using the user interface generated by the secure document application 209. Files may be displayed in a format similar to Windows Explorer®, and files may be identified by drag and drop menus. In step 401 a user selects individual recipient devices from a drop-down menu of devices generated from one of the pre-stored recipient address lists 303. Each individual pre-registered device is listed, and the user may assign an individual document to an individual recipient device. In step 402, the user allocates a quantity print permission for each selected document to each authorised recipient device which the user has selected. Upon a screen, for each selected recipient device, the user may input a number data specifying a number of copies for which permission to print is to be granted. In step 403, having selected the recipient devices, selected the document to send, and allocated quantity permissions to each individual recipient device, the user activates sending of the document to all recipient devices. The document is encrypted by the encryption module 301, and sent across the network via the input/output ports 205 and modem and LAN connection 206. Transport of the encrypted document across the communications network is by conventional manner, and conventional transport protocols, for examples TCP/IP are applied. In step 404, the algorithm records the details of the documents, recipient device addresses and number of authorized copies in the history database 305 which can be accessed at any time by the user to trace where particular documents have been sent and to provide accountability of document transmission at the send computer entity. In step 405, optionally, the send computer entity may receive acknowledgments from each of the specified secure recipient printer devices, acknowledging from each of those devices that the encrypted electronic document has been received. Acknowledgement data recording time and date at which each individual recipient printer device received the document may be stored in the document history database.

Figure 5:
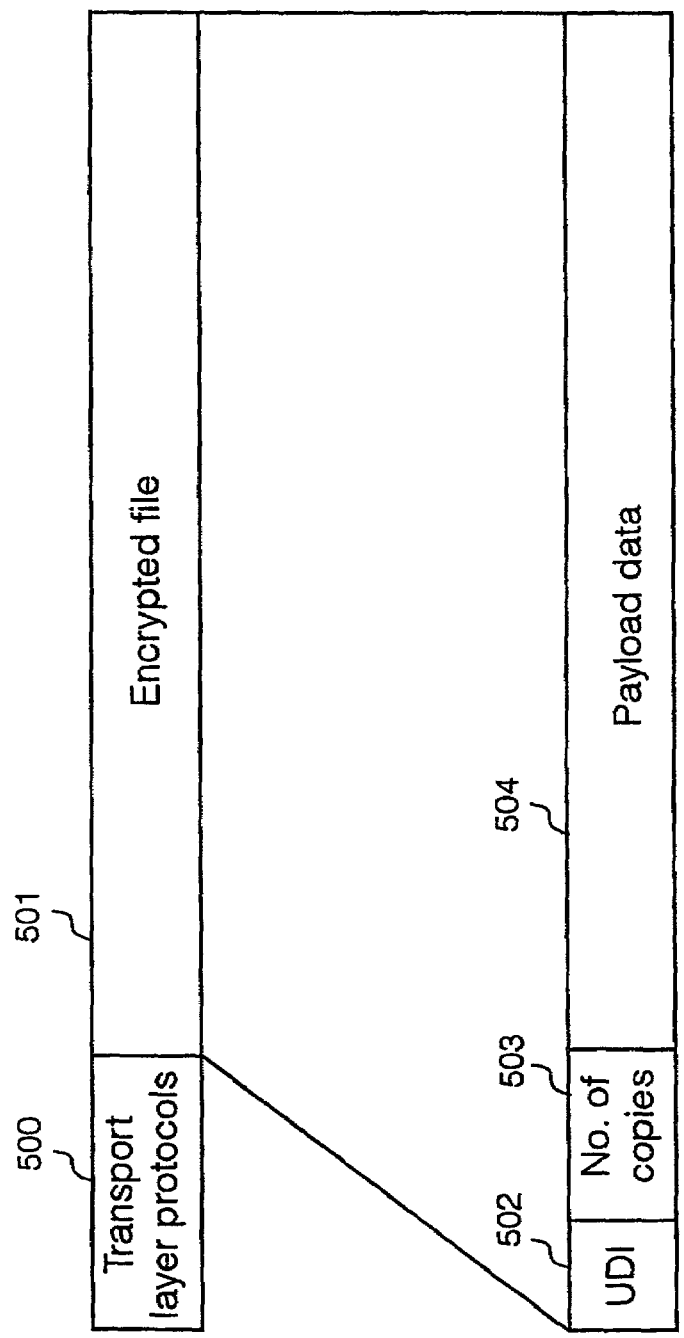
FIG. 5 illustrates schematically a document file format of a secure document file sent over said network.

Referring to FIG. 5 herein, there is illustrated schematically an encrypted file as sent by the sending computer entity. The file comprises known transport layer protocol layers, for example ATM packet headers, TCP/IP protocol headers, or the like, followed by an encrypted file content 501. The complete file, may be packetized according to known transport protocols, into a plurality of packets or cells and sent as a series of individual packetized transmissions over the communications network as is known in the art. Within the encrypted portion of the file, there is included a unique device identifier data 502, a quantity print permission data 503, allowing permission for printing of a specified number of copies; and a payload data 504 being the actual data for containing the information to be printed in hard copy at the recipient device, typically including text and/or image data.

Referring to FIG. 6 herein, there is illustrated schematically a visual display generated at the sending computer entity 200, listing distribution of a particular document. The display is generated from data stored in the document history database 305 and may include an electronic address identifier data 600 identifying a unique electronic address for each of a plurality of recipient devices; data describing an encryption method used, for example a one time key or other known encryption method; a number of copies for which print permission has been given, and an acknowledgment time and date data 603 describing an acknowledgement data received from a recipient print device; a document identification data 604 identifying the documents sent; and optionally, an application data 605 identifying an application package, in which the document is generated.

Figure 7:
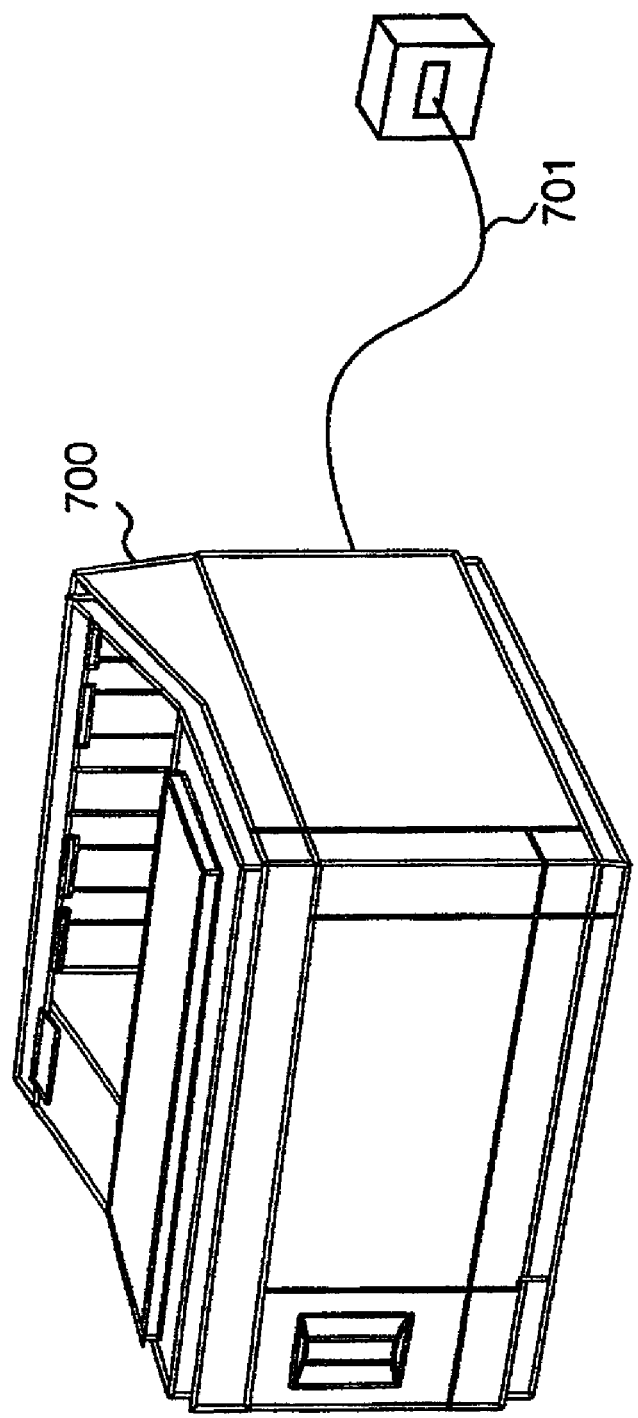
FIG. 7 illustrates in perspective view a network attached secure printer device for securely printing document files received over said network.

Referring to FIG. 7 herein, there is illustrated schematically in perspective view, a secure network attached printing device 700. The secure network attached printing device attaches directly to a network connection 701, eg a CAT5 internal wiring system in a building. The secure printer has its own network address, and receives an encrypted file. The printer decrypts the file using a known encryption scheme, and prints out a specified number of prints of the file authorised to be printed on that device. After the file has printed, the electronic version of the file received by the printer is deleted from the printer's memory. Deletion of electronic data can be implemented by decrypting an electronic page after each physical page is printed, or by deleting the entire file after the entire file has been printed in hard copy.

Figure 8:
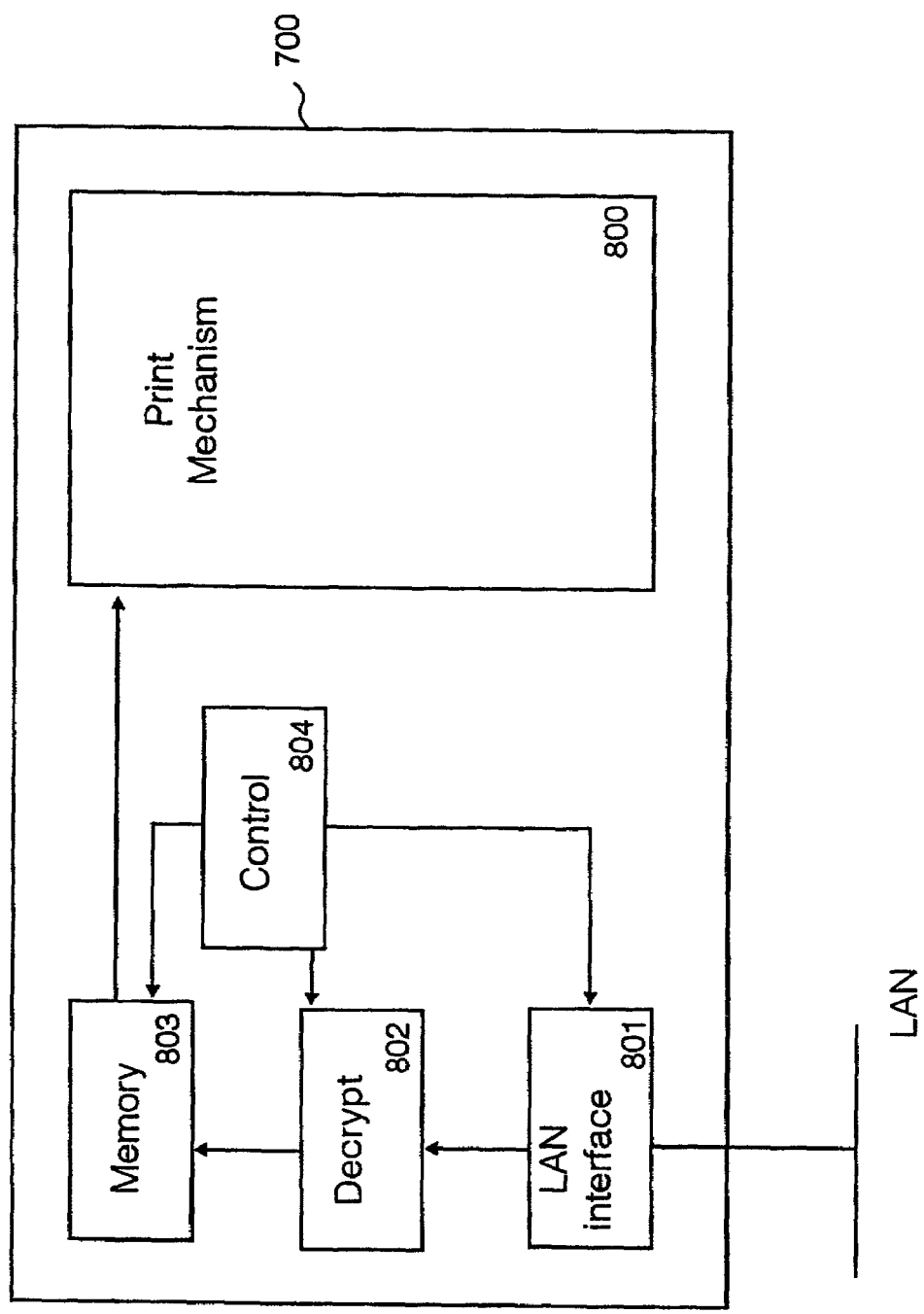
FIG. 8 illustrates schematically internal components of said secure network attached printing device of FIG. 7.

Referring to FIG. 8 herein, there is illustrated schematically components of the secure network attached printer device 700 of FIG. 7 herein. The printer device comprises a print mechanism 800 as is known in the art including a physical transport mechanism for transporting print media, a print head, ink cartridge and control electronics; a network interface 801 e.g. a local area network interface, or a web interface; a decryption module 802 containing a decryption algorithm; a local memory area 803 for storing image data; and a control mechanism 804 for controlling the processing of a data file, received over the network interface 801.

Figure 9:
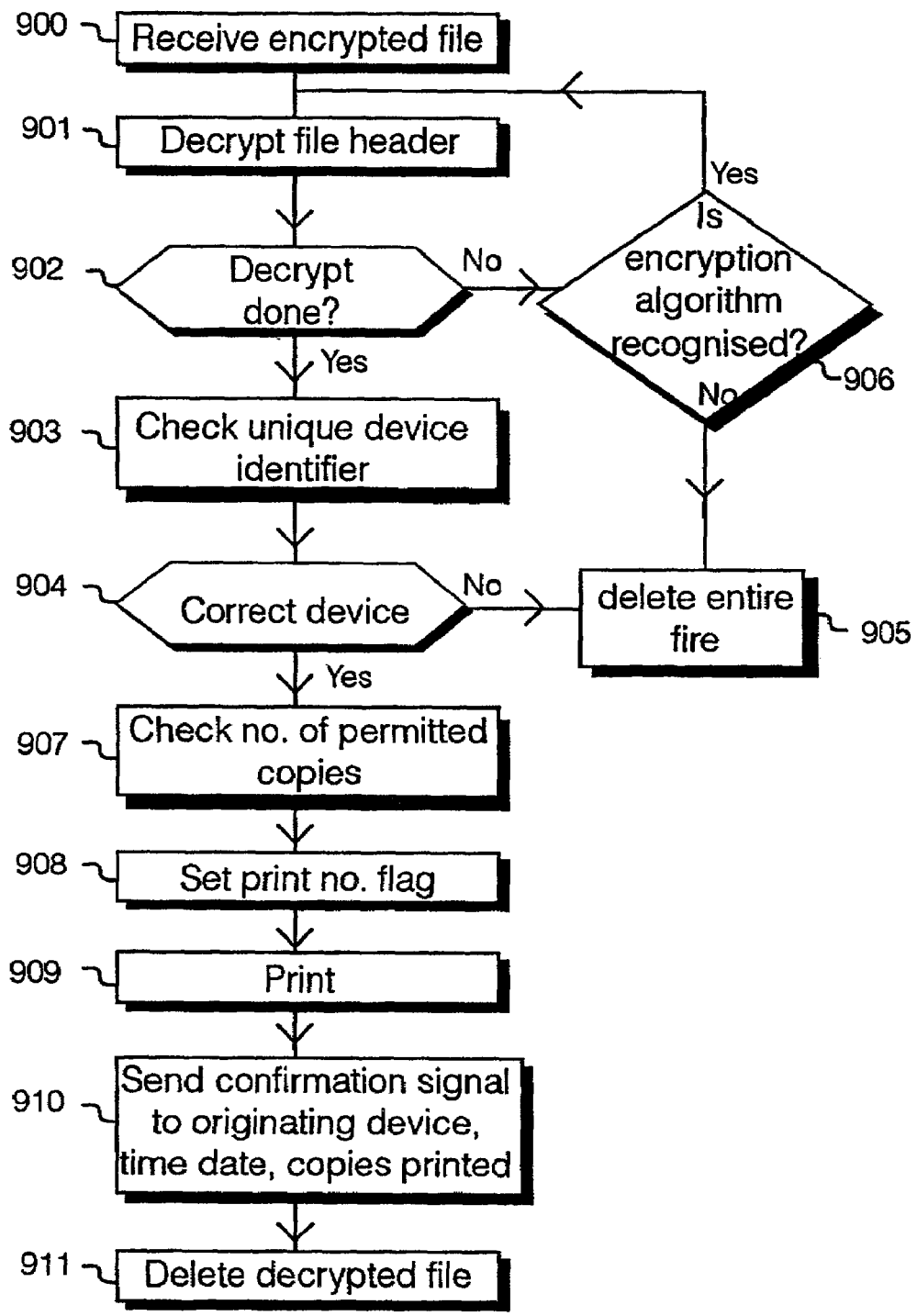
FIG. 9 illustrates schematically process steps carried out by said secure printer device of FIG. 7 for securely printing a physical copy of said document files.

Referring to FIG. 9 herein, there is illustrated schematically process steps carried out at a secure printer device 700 for decrypting and printing a specified number of copies of a received document. In step 900, the printer device receives the encrypted file in known manner. In step 901, the decryption algorithm 802 proceeds to decrypt the file using known decryption techniques. In step 902 the printer device checks a unique device identifier data 502 contained in the decrypted data file, and checks in step 903 whether that unique device identifier corresponds to the device itself. If the unique device identifier is not recognized as being the devices own device identifier data, then the printer deletes the entire file from its memory.

In step 902, if decryption is determined to have been unsuccessful, then in step 906, the algorithm checks whether the encryption algorithm used is of a type recognizable by the printer device. If not, then in step 905 the printer device deletes the entire file from its memory.

In step 907, the printer device checks the permitted print copy number field 503 and sets a print number flag in step 908, which determines how many copies of the file the printer will print. In step 909, the printer proceeds to print the specified number of permitted copies of the file in hard copy. In step 910, the recipient printer device may send a confirmation signal back to the sending computer entity, including a time data, date data, and a number of copies printed, confirming that the printer has printed a specified number of copies at a specified time and date.

Figure 10:
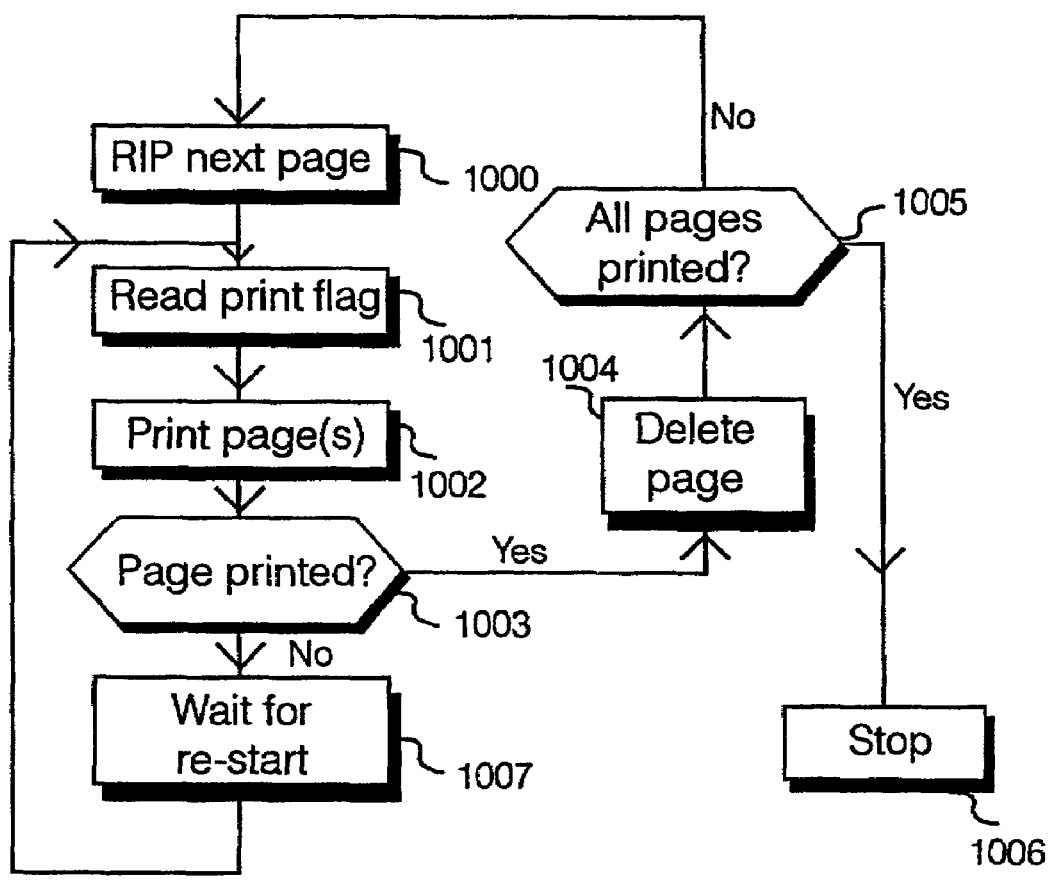
FIG. 10 illustrates schematically further process steps carried out by said secure printing device for printing physical copies of said document file.

Referring to FIG. 10 herein, there is illustrated schematically process steps carried out by the secure printer device for printing the decrypted document. In step 1000, a page of the document is raster image processed to obtain image data in a format suitable for reading by the print mechanism 800 of the device. In step 1001, the print flag is read, and in step 1002, the print mechanism proceeds, under control of the control module 804, to print the permitted copies of the page, specified by the number contained in the print flag, which is initially set at the number of authorised copies read from the quantity print data 503, and is decremented for a page each time a copy of that page is printed.

In step 1003, when all permitted copies of the page are printed. The page data is deleted from the memory in step 1004, and the decrypted data for the next page is raster image processed in step 1000. These steps repeat until all pages of the document have been printed in step 1005, in which case the process stops in step 1006. If at any time printing is interrupted, for example because print media such as paper or ink run out, or if there is a fault, then the printer waits for a restart signal from the prior art known restart mechanisms within the printer.

Figure 11:
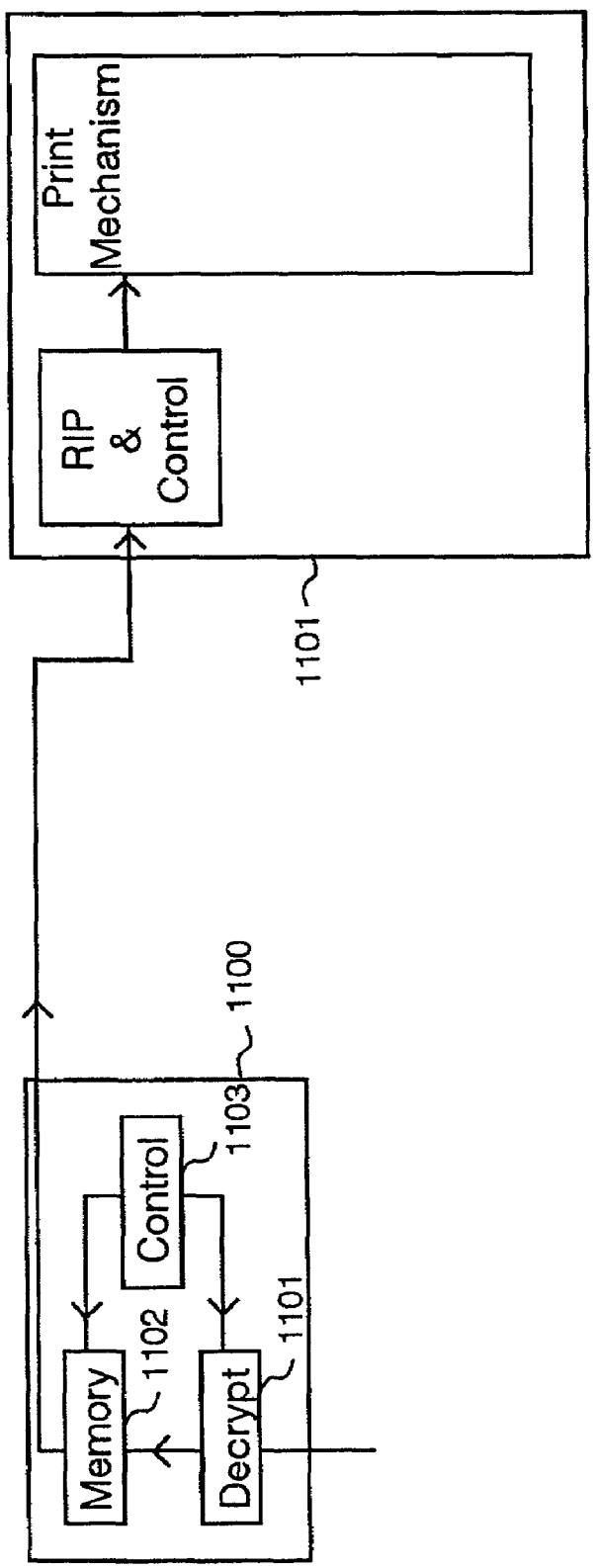
FIG. 11 illustrates schematically components of an application module installed in a computer entity with printer according to a further specific embodiment of the present invention.

Referring to FIG. 11 herein, there is illustrated schematically an applications program 1100 which may be installed in a conventional computer entity and conventional printer device 102 as illustrated in FIG. 1, to convert that conventional computer entity and printer device combination into an authorised recipient device. The application 1100 comprises a decryption algorithm 1101; a control module 1102 for controlling part of the memory of the computer entity for storing of decrypted image data prior to sending to the printer; and a control module 1103.

Similarly as described herein before, the application operates to receive an encrypted document file, containing a unique recipient device identifier data, decrypt that document file, check that a unique device identifier data contained within the received document file matches the stored unique device identifier data embedded within the application itself, and provided the unique device identifier data received in the document file matches that embedded in the application, then to print the individual pages of image data in the document file one at a time, or the whole document at once, then deleting the electronic form of the document file from the computer entity once printing has taken place.

Printing may take place one page at a time, with deletion of the electronic form of the document file occurring for each page, after that page is physically rastered and printed, or alternatively the whole document file may be printed at once, and the electronic form of the document file deleted from the recipient computer entity after physical printing of the whole document has been made.

In the embodiment shown in FIG. 11, because a conventional computer entity and conventional printer are being used, there is the risk of misappropriating the data from a printer port on the computer entity after it has been decrypted and after it has been checked that the document is intended for the particular computer entity as modified by the application, i.e. a specific recipient device. However, there is still an improvement compared to prior art document transfer systems, because once the document has been sent to print, the electronic version of the document file is deleted from the computer entity.

The application can either be embedded with a unique identifier data during manufacture, which is different for each particular application, or a unique identifier data can be provided in an external plug in device e.g. dongle (dongle devices being known in the art), where the external device is programmed with the unique identifier data which converts the conventional computer entity into an authorised recipient device.

In the implementations described herein, in a best mode the sending computer entity and recipient devices are factory embedded with unique device identifier data which pre-match, and make the sending computer entity and recipient devices difficult to tamper with. In other implementations, the sending computer entity may be allocated a large number of possible unique device identifiers, enabling expansion of the system to incorporate further authorised recipient devices. Each authorised recipient device may be provided at manufacture with the decryption algorithms without embedding the unique device identifier data, and the unique device identifier data may be installed in a recipient device after manufacture, for example in the form of a plug in hardware device e.g. a dongle or similar.

Specific implementations according to the present invention may have advantages over prior systems including the following;

The printer stores a decryption key so there is no need for a user to enter a smart card containing a decryption key. The printer is capable of decrypting an encrypted document file.

Within the document file, there is a printer device identifier. This matches a locally stored identifier data identifying the printer device, and enables the printer to print out documents of received files if these two identifiers match. The printer device is capable of printing a specified number of copies of a document, where that number is specified in the received file, and then deleting the document file from the printer's memory once those predetermined number of copies have been printed.

In the case where the identifier data in a received document file does not match the unique identifier data of the printer device, the printer automatically deletes a file without printing the file at all, thereby reducing the risk of misappropriating a document file to be printed on a specific printer to which it was not intended.

The invention claimed is:

1. A printer device comprising:
   a data input device for receiving an encrypted digital document file;
   a decryption algorithm for decrypting said received document file;
   a controller for controlling printing of an image of data contained in said received document file, wherein said controller operates to read quantity permission data from said document file, said quantity permission data specifying a number of copies of said document file authorized to be printed, and wherein said controller operates to generate a confirmation message confirming receipt of said document file; and
   a printer mechanism for printing a physical copy of said document file,
   wherein said controller operates to control printing of the number of copies authorized to be printed, and after printing the number of copies authorized to be printed of the document file, automatically deletes said document file from said memory.

2. The printer device as claimed in claim 1, further comprising a decryption key locally stored in said printer device.

3. The printer device as claimed in claim 1, comprising a network interface for receiving said encrypted digital document file over a network.

4. The printer device as claimed in claim 1, wherein said controller stores a unique device identification data uniquely identifying said printer device, said controller operating to:
   compare a received unique identifier data contained in said received document file with said stored unique device identifier; and
   if said received unique device identifier data differs from said stored unique device identifier data, delete said document file.

5. The printer device as claimed in claim 1, wherein said controller stores a unique device identification data uniquely identifying said printer device, said controller operating to:
   compare a received unique identifier data contained in said received document file with said stored unique device identifier; and
   if said received document identification data is identical to said received unique device identifier data, control said print mechanism to print at least one said physical copy of said document file.

6. The printer device as claimed in claim 1, wherein
   said confirmation message comprises a time and date data, specifying a time and date of receipt of said document file and a number of copies printed data, specifying a number of copies of said document file physically printed by said print mechanism.

7. A printer device comprising:
   a data input device for receiving an encrypted digital document file;
   a decryption algorithm for decrypting said received document file;
   a controller for controlling printing of an image of data contained in said received document file, wherein said controller operates to read a quantity permission data content from said document file, said quantity permission data specifying a number of authorized copies of said document file to be printed, and wherein said controller operates to generate a confirmation message confirming receipt of said document file; and
   a printer mechanism for printing a physical copy of said document file, wherein said controller operates to check a unique device identification data contained in said document file with a stored unique device identification data of said printer device, and provided a successful match is found, to print said physical copy of said document file and to delete said document file after printing said physical copy; and
   if said received unique device identifier differs from said stored unique device identifier data, said controller operates to delete said document file without printing a physical copy of said document file.

8. A computer system configured for sending secure encrypted document files, said system comprising:
   a data processor;
   a memory;
   an encryption algorithm capable of encrypting a document file;
   a device selector for selecting a said uniquely identifiable recipient device;
   a file selector for selecting a document file;
   a stored list of a set of authorized recipient devices, each said recipient device identified by a unique device identifier data inaccessibly embedded within said computer system;
   wherein said computer system operates to:

select at least one document file, wherein the selected document file comprises quantity permission data specifying a number of copies of said document file authorized to be printed;

select at least one said uniquely identifiable recipient device to send said document to:

encrypt said document files; and address said at least one document file to said selected uniquely identified recipient device; and at least one recipient printer device, said recipient printer device capable of receiving an encrypted document file, establishing that said encrypted document file is intended for said recipient printer device, generate a confirmation message confirming receipt of said document file, decrypting and printing said encrypted document file, and automatically deleting said document file after printing a physical copy of a document from said document file.

9. The system as claimed in claim 8, further comprising:
a network interface capable of sending said document file over a network to said selected recipient device.

10. The system as claimed in claim 8, wherein:
said controller operates to read a quantity permission data content of said document file, said quantity permission data specifying a number of authorized copies of said document file to be printed.

11. The computer system as claimed in claim 8, additionally comprising a user interface configured to display:
data describing an encryption method used for sending said document.

12. The computer system as claimed in claim 8, additionally comprising a user interface configured to display:
an acknowledgement message data describing receipt of said document file by said recipient device.

13. A distributed secure document printing system, said system comprising:

at least one sending computer entity, capable of sending an encrypted electronic document file, said document file having an encrypted data content, and a unique device identifier data identifying a recipient printer device to which said document file is intended to be printed by; and at least one recipient printer device, said recipient printer device capable of receiving said encrypted document file, establishing that said document file is intended for said recipient printer device, decrypting and printing said document file, and automatically deleting said electronic document file after printing a physical copy of a document from said document file;

wherein said recipient printer device is configured to send a confirmation message back to said sending computer entity, confirming receipt of said document file, and confirming printing of a specified permitted number of copies of said document file, wherein the specified permitted number of copies of said document file is contained within the document file.

14. The system as claimed in claim 13, wherein said recipient printer device is capable of reading a permitted quantity data content of said document file; and said recipient printer device operates for printing a number of physical copies of said document file, corresponding to said permitted quantity data.

15. A method of securely communicating an electronic document file over a network, said method comprising the steps of:

encrypting said document file;

specifying a recipient device for sending said document file to, said recipient device being uniquely identifiable by a unique device identifier data;

attaching said unique identifier data to said document file;

sending said document file in encrypted format to said intended recipient device;

receiving said transmitted document file and decrypting said document file;

reading said unique device identifier data of said document file;

if said unique device identifier data of said document file corresponds to a unique device identifier data of said recipient device, printing a physical copy of said document file and automatically deleting said document file;

if said unique device identifier data of said document file does not correspond with said unique device identifier data of said recipient device, deleting said received document file without printing a physical copy of said document file; and sending, from said recipient device, a confirmation message back to said sending computer entity, confirming receipt of said document file, and confirming printing of a specified permitted number of copies of said document file, wherein the specified permitted number of copies of said document file is contained within the document file.

16. A method of secure printing of a received document file, said method comprising the steps of:

receiving said document file in encrypted format at a receiving device;

decrypting said document file;

reading a unique device identifier data identifying a recipient device for which said document file is intended;

comparing said unique device identifier data with a locally stored device identifier data stored at said receiving device;

if said received unique device identifier data corresponds with said locally stored device identifier data, printing at least one physical copy of said document file and automatically deleting said document file;

if said received unique device identifier data differs from said stored unique device identifier data, deleting said document file; and sending, from said recipient device, a confirmation message back to said sending computer entity, confirming receipt of said document file, and confirming printing of a specified permitted number of copies of said document file, wherein the specified permitted number of copies of said document file is contained within the document file.

17. The method as claimed in claim 16, further comprising the step of:
deleting said electronic document file, after printing said physical copy of said document file.

18. The method as claimed in claim 16, further comprising the step of:
reading a permitted quantity data describing a permitted quantity of copies of said document file; and
printing said permitted quantity of copies of said document file.

19. The method as claimed in claim 16, wherein said document file, after decryption is prevented from being viewed on a visual display device prior to printing.

20. The method as claimed in claim 16, wherein said document file is received via an intermediary carrier device having data storage capability.

21. A method of sending a document file for printing by a specified authorized recipient printing device, said method comprising the steps of:
selecting a content of said document file;
encrypting said content;
attaching a unique device identifier data, identifying a recipient device to which said document file is to be sent;
sending said document file to said recipient device;
adding a permitted quantity data to said document file, said permitted quantity data specifying a permitted number of copies of said document file which can be printed; and
receiving a confirmation message confirming receipt of said document file.

22. The method as claim in claim 21, further comprising the steps of:
storing a document history data, said document history data specifying for said document file:
a list of at least one recipient device to which said document file may be sent;
a number of permitted copies of said document file which are permitted to be printed by each said recipient device.

23. A computer entity comprising a data processor, a data storage device, a printer port, and having an attached printer device, said computer entity comprising:
a module for decrypting an encrypted document file;
a unique device identifier for identifying said computer entity;
wherein said computer entity operates to:
receive a document file in encrypted format;
decrypt said document;
extract a unique device identifier data from said document;
compare said extracted unique identifier data with said unique device identifier of said computer entity;
if a match is found between said received unique device identifier data of said document and said unique identifier of said computer entity, send a said document file for printing by said attached printer device; and
after sending said document to said printer device, delete said document file from said computer entity;
adding a permitted quantity data to said document file, said permitted quantity data specifying a permitted number of copies of said document file which can be printed; and
receiving a confirmation message confirming receipt of said document file.

24. A method of secure printing of a received document file, said method comprising the steps of:
receiving said document file in encrypted format;
reading a unique device identifier data identifying a recipient device for which said document file is intended;
comparing said unique device identifier data with a locally stored identifier data corresponding to a local computer entity device;
if said locally stored identifier data differs from said unique device identifier data identifying said recipient device for which said document file is intended, deleting said document file without printing any physical copies of said document file;
printing a number of physical copies of said document file, corresponding to a permitted quantity defined in said document file, wherein the specified permitted number of copies of said document file is contained within the document file and wherein said document file is automatically deleted; and
sending a confirmation message confirming receipt of said document file.

25. A method of secure printing of a received document file, said method comprising the steps of:
receiving said document file in encrypted format;
sending a confirmation message confirming receipt of said document file;
reading a unique device identifier data identifying a recipient device for which said document file is intended;
comparing said unique device identifier data with a locally stored device identifier data;
reading a permitted quantity data describing a permitted quantity of copies from said document file;
if said received unique device identifier data corresponds with said locally stored device identifier data, printing said permitted quantity of copies of said document file and automatically deleting said document file; and
printing a number of physical copies of said document file, corresponding to a permitted quantity defined in said document file.

26. A printer device comprising:
a data input device for receiving an encrypted digital document file;
a decryption algorithm for decrypting said received document file;
a controller for controlling printing of an image of data contained in said received document file, for sending a confirmation message upon receipt of the document file and for automatically deleting said document file; and
a printer mechanism for printing a physical copy of said document file,
wherein said printer device locally stores a decryption key for operating said decryption algorithm to decrypt said received document file;
wherein said printer device is configured to send a confirmation message back to said sending computer entity, confirming receipt of said document file, and confirming printing of a specified permitted number of copies of said document file, wherein the specified permitted number of copies of said document file is contained within the document file.

27. A printer device comprising:
a data input device for receiving a digital document file;
a controller for controlling printing of an image of data contained in said received document file and for sending a confirmation message upon receipt of the document file; and
a printer mechanism for printing a physical copy of said document file,
wherein said controller operates to compare a received unique identifier data contained in said received document file with a locally stored unique device identifier data stored at said printer device and operates to control printing of a predetermined quantity of said physical copy, wherein said predetermined quantity is specified in said received document file;
if said received unique identifier data matches said stored unique device identifier, control printing of at least one said physical copy of said document file and automatically delete said document file; and
if said received unique identifier data contained the said received document file does not match said stored unique device identifier data, to inhibit printing of any physical copies of said document file.

28. A printer device comprising:

a data input device for receiving an encrypted digital document file;

a decryption algorithm for decrypting said received document files;

a controller for controlling printing of an image of data contained in said received document file; and a printer mechanism for printing a physical copy of said document file, wherein a decryption key is stored locally in said printer device for operating said decryption algorithm to decrypt said received document files;

said controller operates to compare a received unique identifier data contained in said received document file with a locally stored unique device identifier data stored at said printer device;

if said received unique identifier data matches said stored unique device identifier, control printing of at least one said physical copy of said document file and automatically deleting said document file; and if said received unique identifier data contained the said received document file does not match said stored unique device identifier data, to inhibit decryption of said document file and inhibit printing of any physical copies of said document file;

wherein said printer device is configured to send a confirmation message back to said sending computer entity, confirming receipt of said document file, and confirming printing of a specified permitted number of copies of said document file, wherein the specified permitted number of copies of said document file is contained within said document file.

* * * * *